H. DEBAUGE.
PROCESS FOR THE COMPLETE REMOVAL OF RUBBER FROM THE CANVAS OF WORN OUT PNEUMATIC TIRES.
APPLICATION FILED JULY 20, 1916.
1,248,463. Patented Dec. 4, 1917.
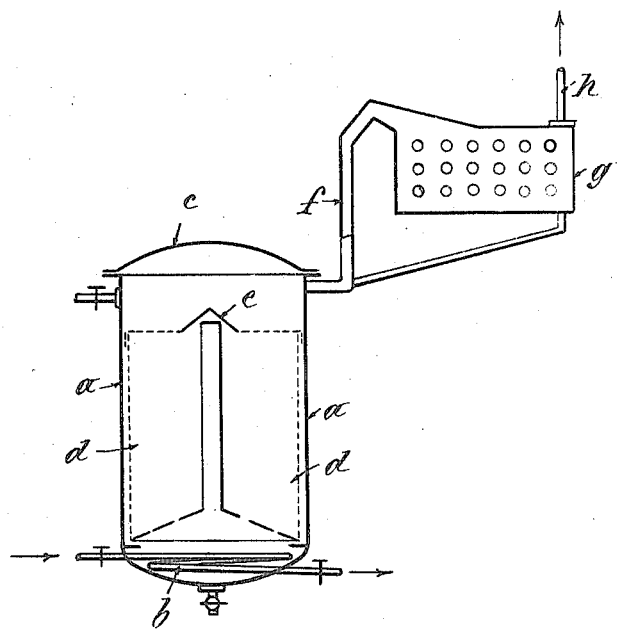
Inventor
Henry Debauge
by Otto Munn R
his Attorney

UNITED STATES PATENT OFFICE.

HENRY DEBAUGE, OF PARIS, FRANCE.

PROCESS FOR THE COMPLETE REMOVAL OF RUBBER FROM THE CANVAS OF WORN-OUT PNEUMATIC TIRES.

1,248,463.   Specification of Letters Patent.   Patented Dec. 4, 1917.

Application filed July 20, 1916. Serial No. 110,383.

*To all whom it may concern:*

Be it known that I, HENRY DEBAUGE, citizen of the Republic of France, residing at Paris, France, have invented new and useful Improvements in Processes for the Complete Removal of Rubber from the Canvas of Worn-Out Pneumatic Tires, of which the following is a specification.

Among the numerous methods hitherto employed for removing the rubber which adheres to the canvas employed in the manufacture of pneumatic tires, none can be cited which permit the entire recovery of the rubber without involving the loss of the canvas, and this latter has a considerable commercial value. In fact it is the custom to sacrifice the canvas in order to recover the rubber which forms the principal part of the pneumatic tire (methods employing acids, salts, etc.) and this causes a total loss of a material which could be further utilized.

In the inventor's French Patent No. 460,273, dated July 12. 1913, a process is described which allows of separating the canvas from the rubber, but this method does not give a complete recovery of the said rubber which adheres to the cloth.

The method which is the subject of the present application allows of the complete recovery of the rubber contained in the canvas, and as the latter is entirely free from rubber, it can be further used in the shape of a first class and not a second class product.

In the inventor's French Patent of Addition No. 19,142 dated April 9, 1914, it is noted that vulcanized rubber is made to dissolve in a solvent solution by a very strong agitation accompanied by a high temperature. In the patent of addition, the very powerful stirring effect was obtained by means of blades which rotate at the rate of 300 to 500 revolutions per minute.

In the process which is the subject of the present invention, the stirring effect is produced by a strong boiling of the liquid (zylol) in vacuum at about 100 to 110 degrees C. combined with circulation movements of the liquid resembling what is set up in the ordinary lye boilers.

The present method can be applied by the use of an apparatus which is schematically represented in the accompanying drawing containing a single figure.

This apparatus is composed of a closed boiler or digester $a$ at the bottom of which is placed a worm pipe $b$ for applying steam heating. A steam jacket or any other suitable means can also be employed for this heating. The digester is closed by the removable cover $c$, and in the interior is placed a removable perforated holder $d$, provided at the top and at the central part with an inverted cone $e$ such as is employed in the usual lye boilers. In this holder are placed the pieces of canvas from which the rubber is to be removed, this cloth having been previously washed as will be further set forth. The upper part of the digester $a$ is connected by means of piping $f$ with a condensing cooler which returns the liquid coming from the condensed vapors, into the digester. A pipe $h$ connects the cooler to a vacuum pump and the apparatus is also provided with a pressure gage, a thermometer and a safety valve.

The method of operation is the following:

After the removal of the cloth from the pneumatic tire which is realized by the use of xylol, according to the process described in the above cited French Patent No. 460,273, the cloth pieces are placed in an ordinary vessel together with cold xylol, and this removes the portions of rubber which adhere but slightly to the cloth, and at the same time effects the washing in order to remove the resins and free sulfur from the adherent rubber. The length of time usually found best for the treatment is two hours.

The impure xylol resulting from this operation may be employed to advantage in order to swell out the rubber of worn out tires, being however previously filtered in order to remove the particles of rubber in suspension in the liquid. After a centrifugation which is carried out in the washing vessel itself, the cloth is placed in the perforated holder $d$ and the latter is inserted in the digester which contains clean xylol. After creating a vacuum in the digester, a heat of about 110 degrees C. is applied and this produces a violent boiling action. The length of time for this operation is ten hours. When the operation is judged to be finished, the digester is emptied through the bottom and a second operation identical with the first is effected, then a final washing with clean xylol.

All the liquids which are employed to treat the cloth according to the present description and which contain dissolved rubber can be used to dissolve the granular rubber resulting from the separation of the cloth from the rubber by means of the apparatus described in the French Patent of Addition No. 19,142.

By proceeding in the above described manner, there is produced an almost complete removal of the rubber from the cloth, but in order to effect an entire removal, a fresh quantity of xylol is added in the digester and the temperature is raised to about 150 degrees C. under pressure, and this operation is carried out for a certain length of time (two hours). When the operation is finished, the cloth pieces are returned to the washing vessel in which they are washed and centrifugated with clean xylol, and the cloth is then dried by means of a current of hot inert gas, then removed from the washing vessel. It is evident that in the case of the last washing operation there is employed a stream of liquid in order to minimize the amount of clean xylol.

Should it be desired to obtain a very white cloth, it is sufficient to treat the cloth in any suitable bleaching bath, and the fact that this operation is easily carried out is a proof that the rubber has been completely removed from the cloth.

The above described method may be applied to any other solvent for vulcanized rubber, and temperature and pressures will vary according to the character of the solvent.

Having now described my invention, what I claim as new and desire to secure by Letters Patent is:

1. A process for the complete separation of rubber from the pieces of canvas, removed from worn out pneumatic tires consisting in washing and centrifuging the pieces with a cold solvent for vulcanized rubber, boiling in a digester, with clean solvent, in vacuum and then adding a fresh quantity of solvent in the digester and raising the temperature under pressure, then washing and drying the pieces of canvas, and treating in a bleaching bath, substantially as described and for the purpose set forth.

2. A process for the complete separation of rubber from the pieces of canvas removed from worn out pneumatic tires consisting in washing and centrifuging the pieces with cold xylol, boiling in a digester, with clean xylol, in vacuum and at a temperature of 100–110° C. then adding a fresh quantity of xylol in the digester and rasing the temperature to about 150° C. under pressure, then washing and drying the pieces of canvas and treating in a bleaching bath, substantially as described and for the purpose set forth.

In testimony whereof I have signed my name to this specification in the presence of two subscribing witnesses.

HENRY DEBAUGE.

Witnesses:
CHAS. P. PRESSLY,
LOUIS MOSES.